H. M. DUDLEY.
TEXTILE TREATING DEVICE.
APPLICATION FILED FEB. 25, 1919.
1,334,529.
Patented Mar. 23, 1920.
15 SHEETS—SHEET 3.
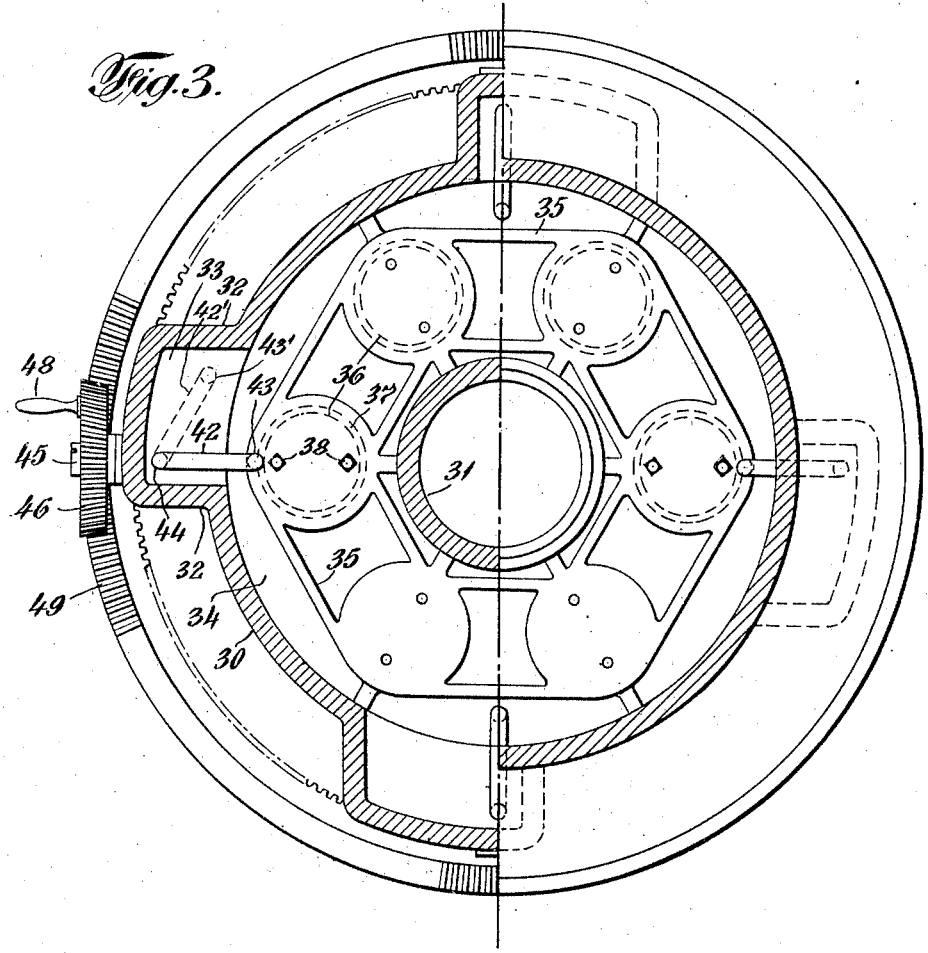
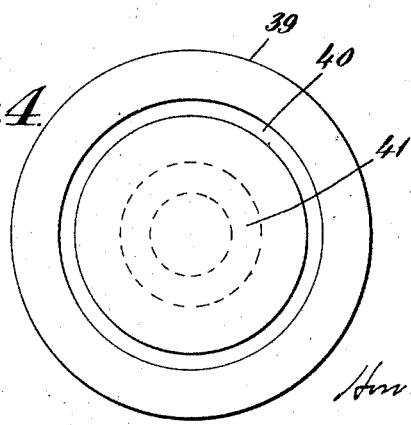

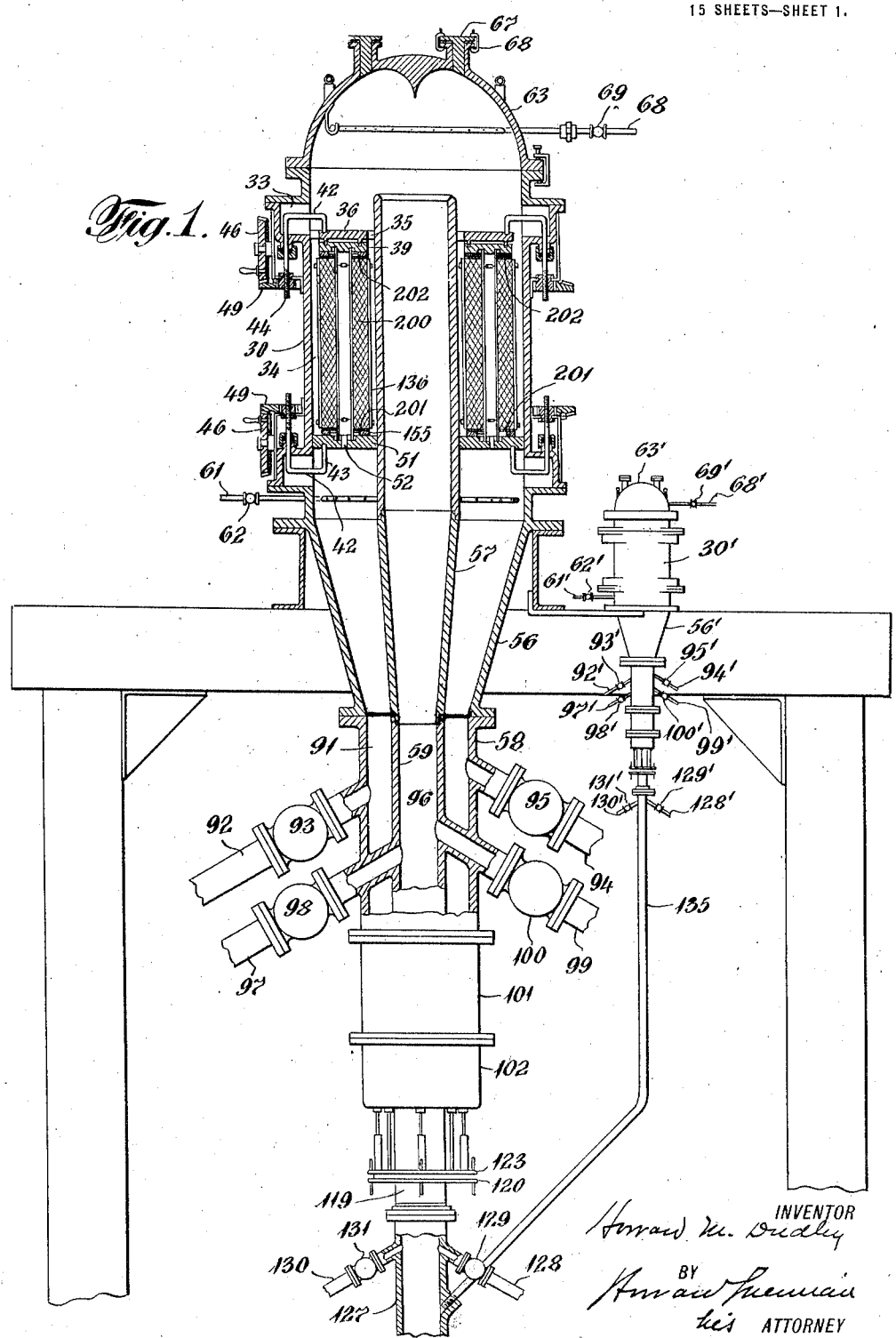

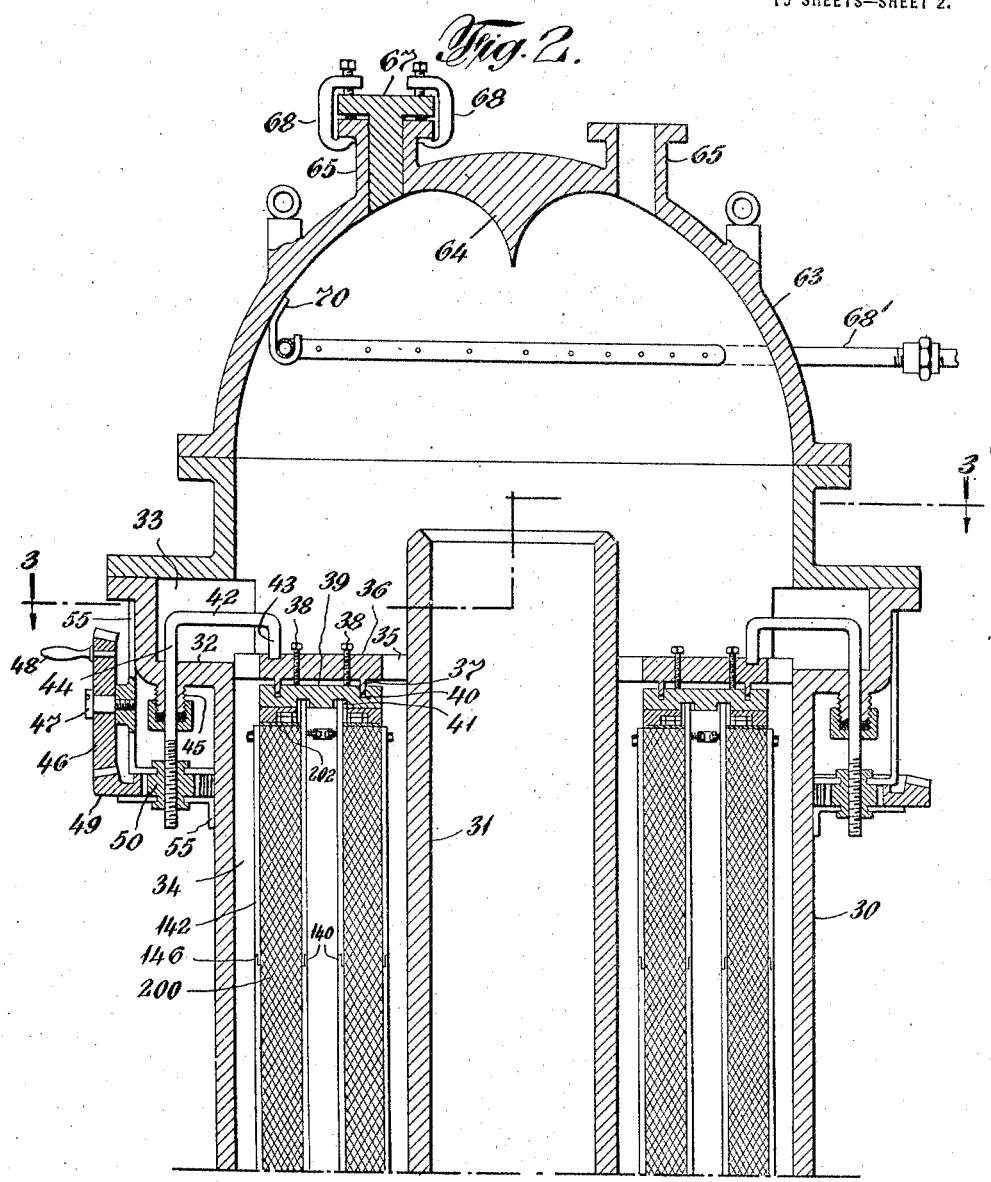

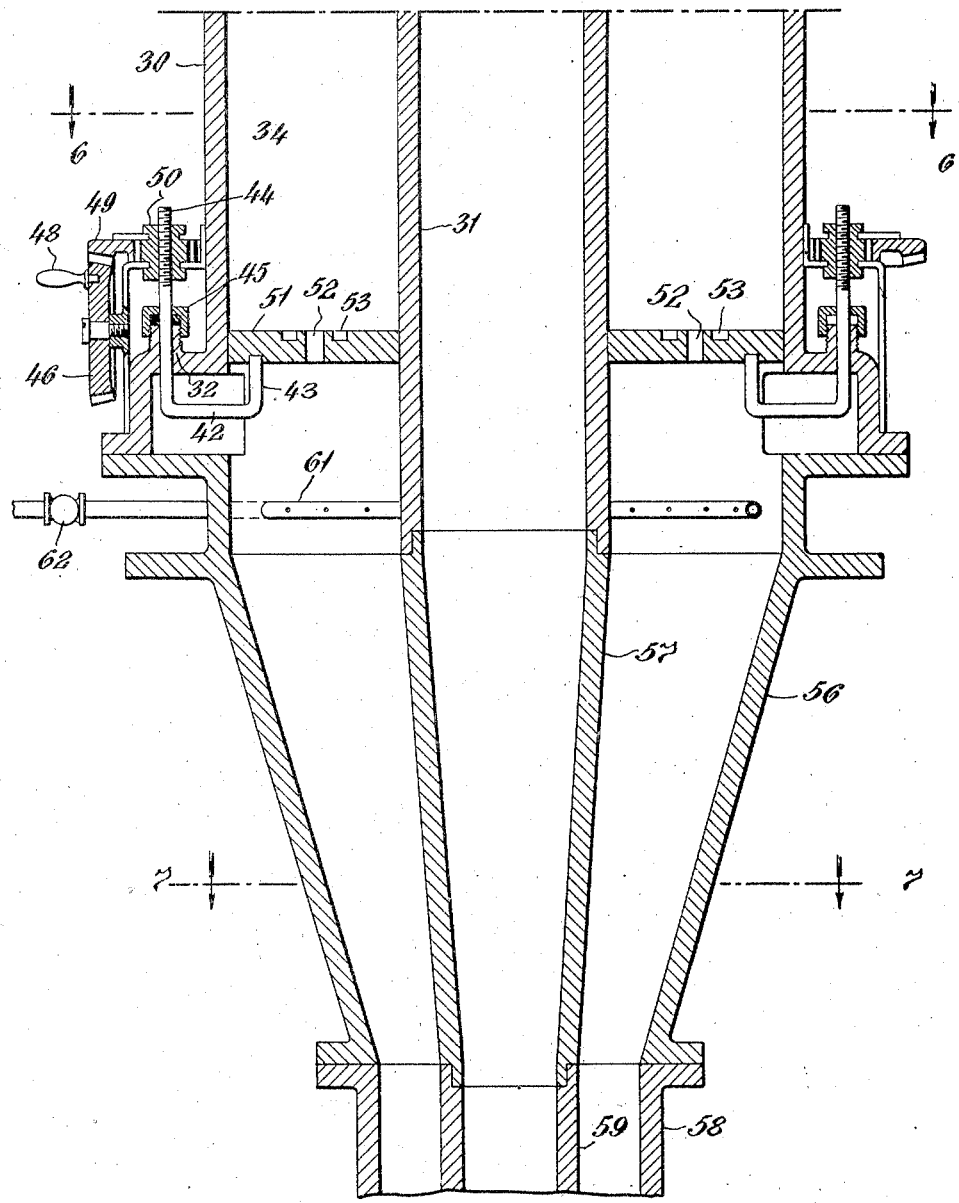

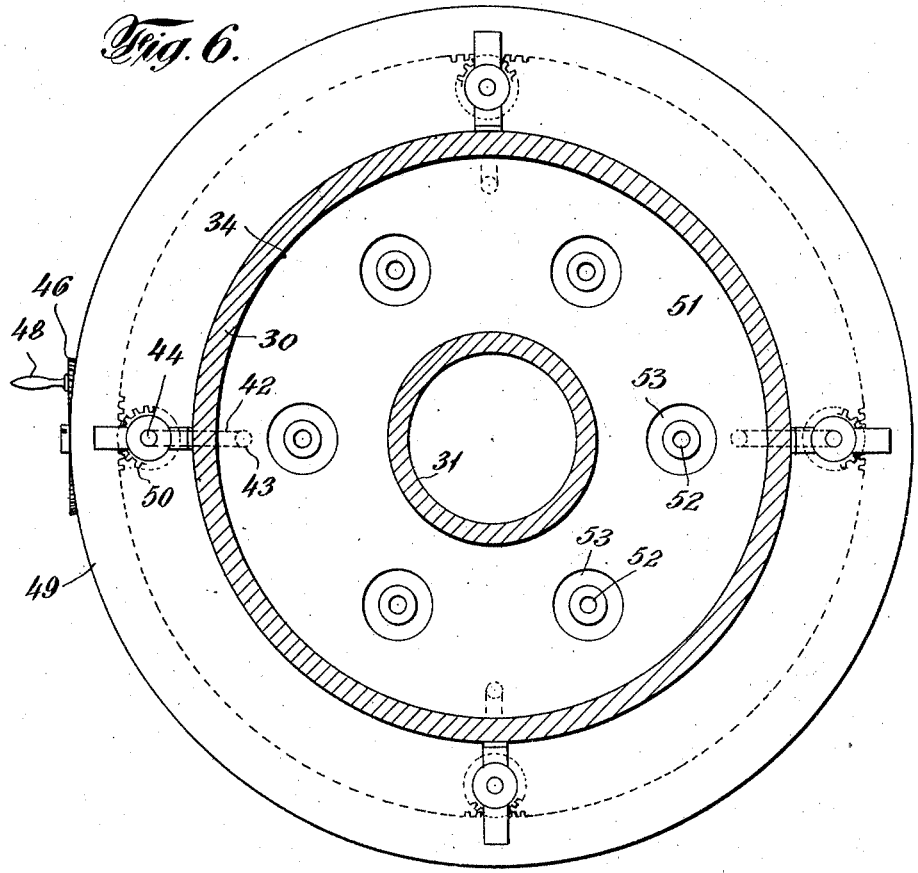
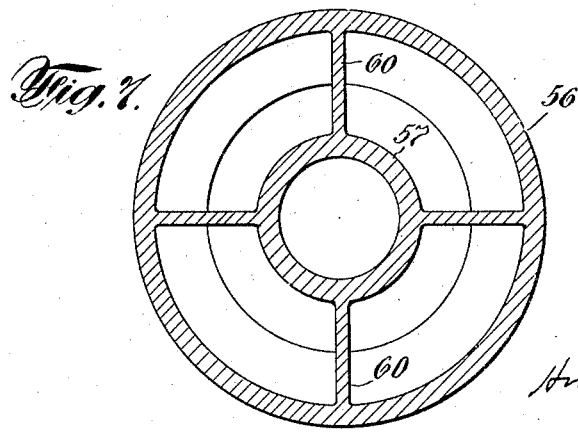

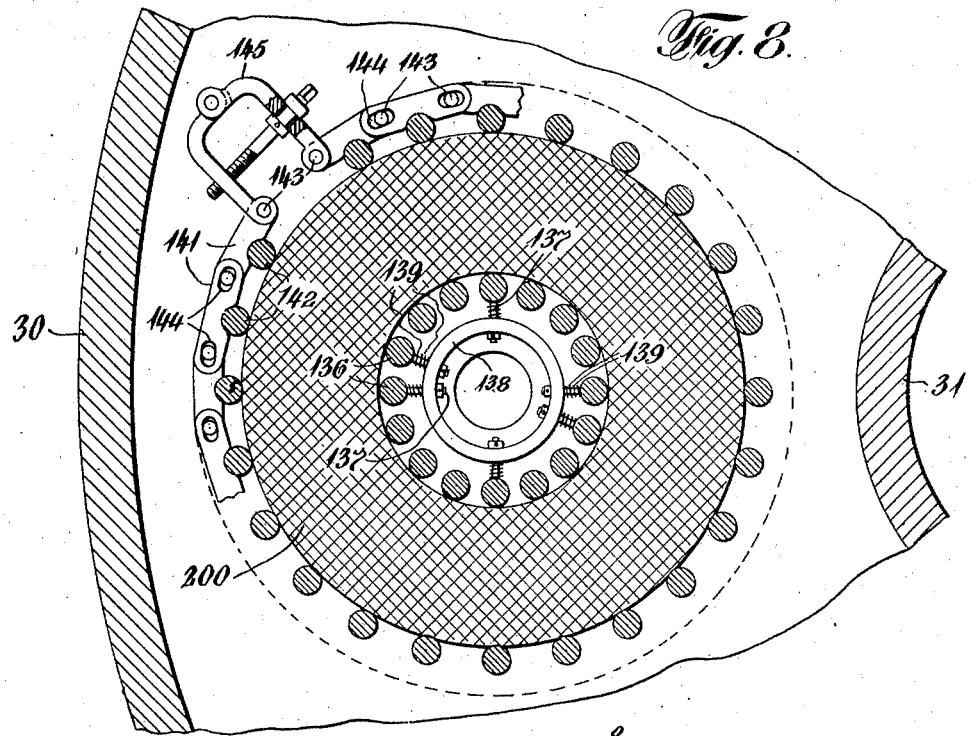
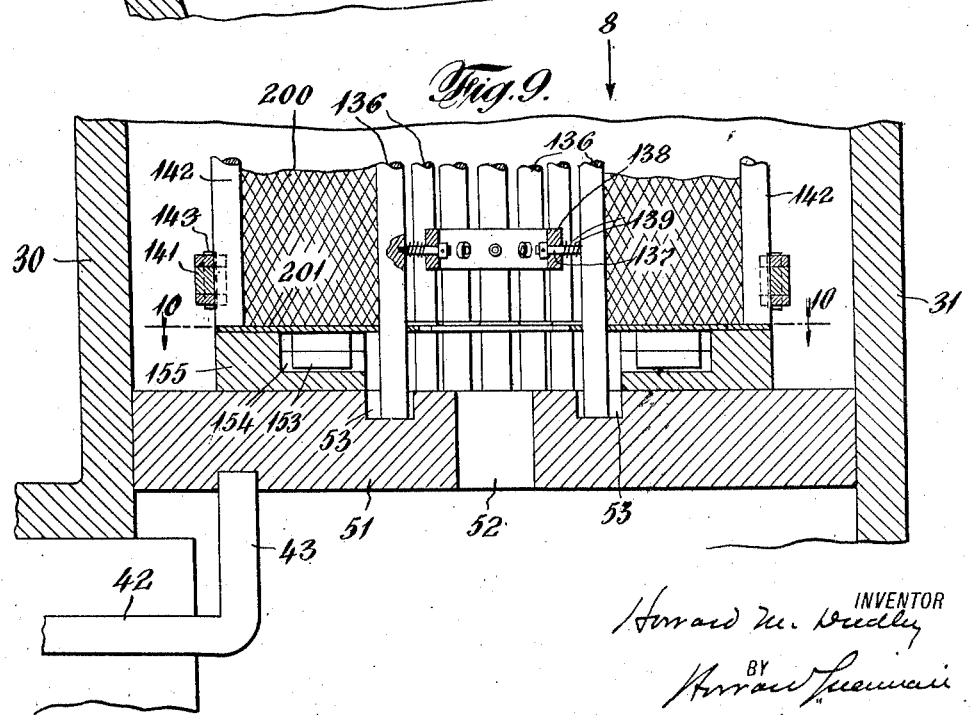

H. M. DUDLEY.
TEXTILE TREATING DEVICE.
APPLICATION FILED FEB. 25, 1919.
1,334,529.
Patented Mar. 23, 1920.
15 SHEETS—SHEET 7.
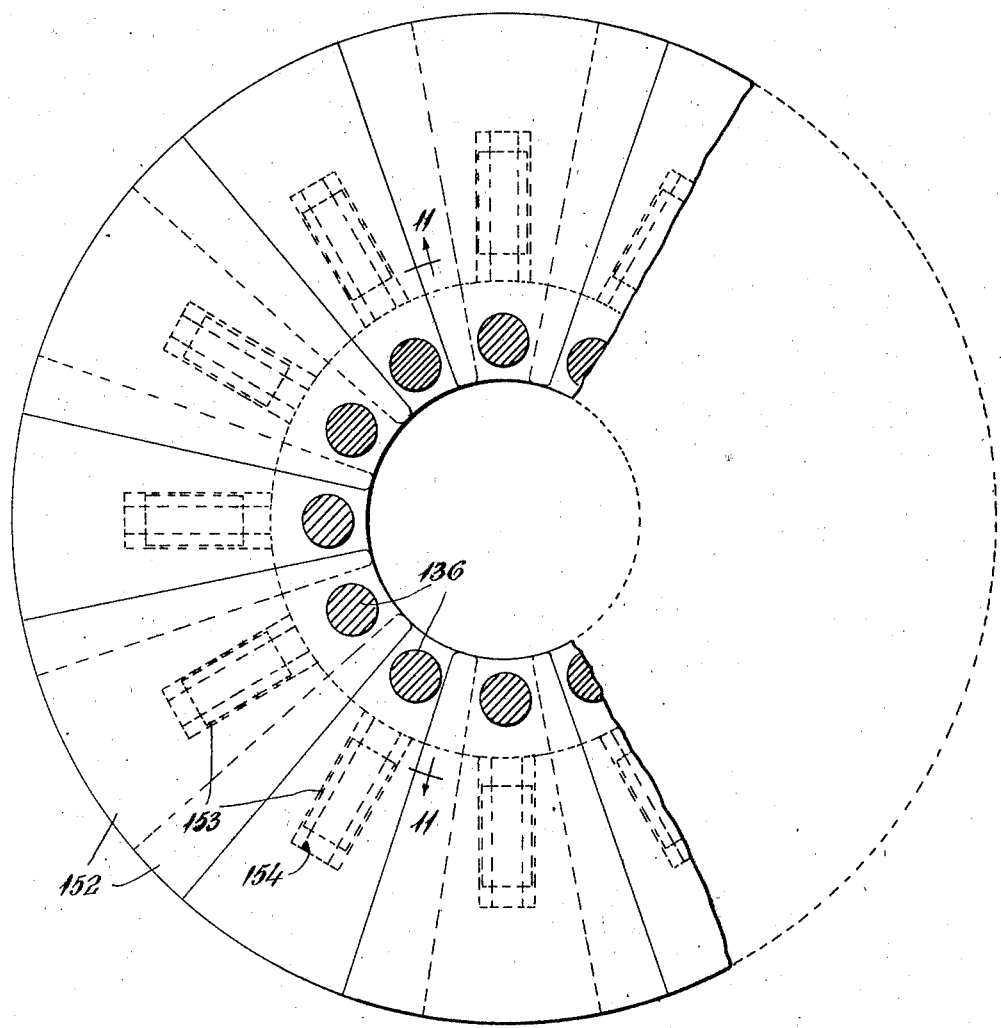
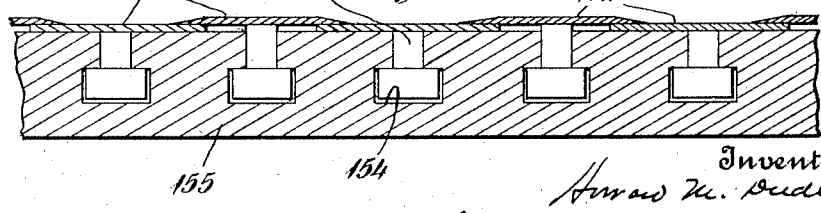

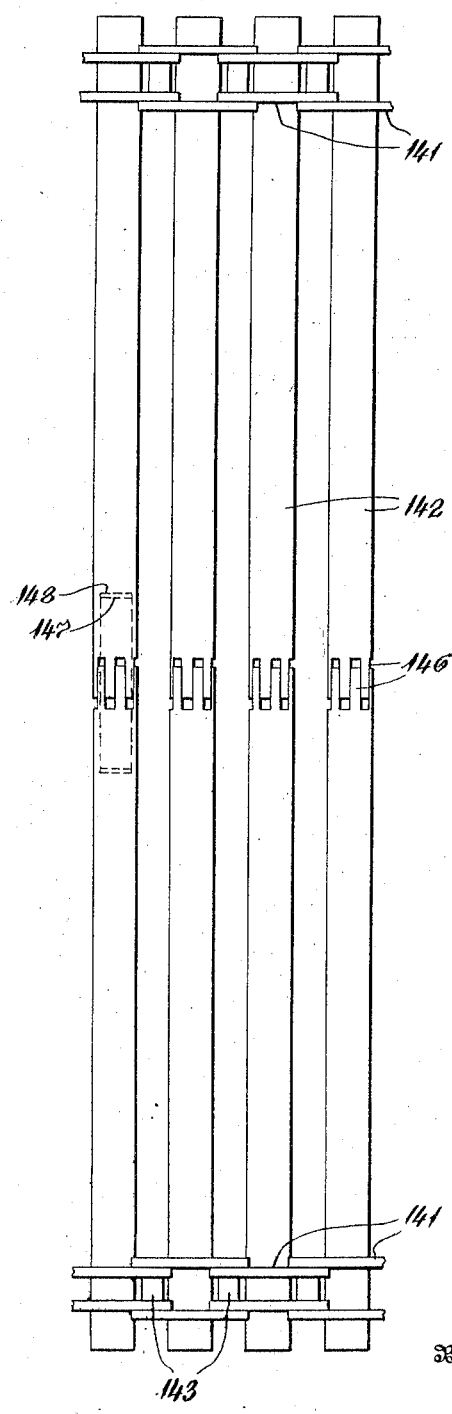
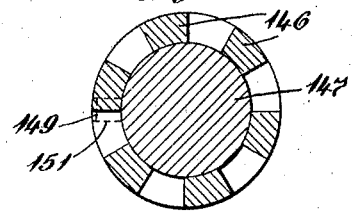
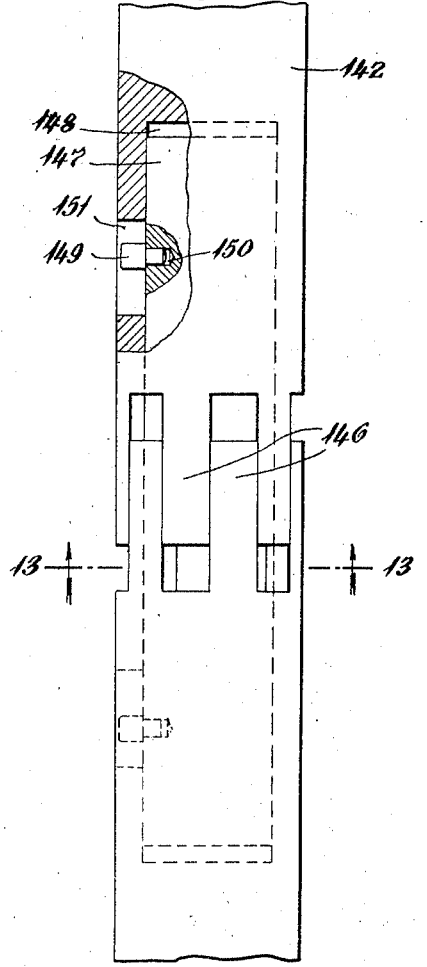

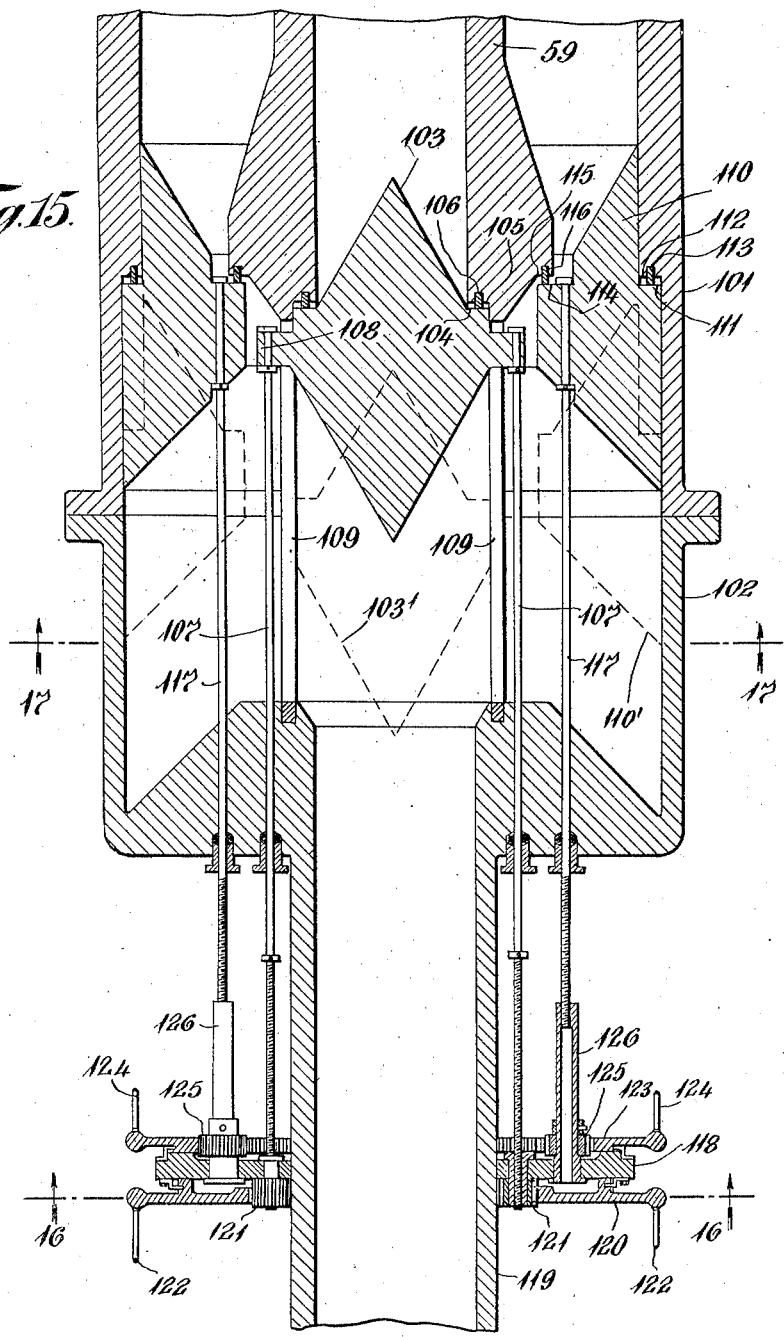

H. M. DUDLEY.
TEXTILE TREATING DEVICE.
APPLICATION FILED FEB. 25, 1919.

1,334,529.

Patented Mar. 23, 1920.
15 SHEETS—SHEET 10.

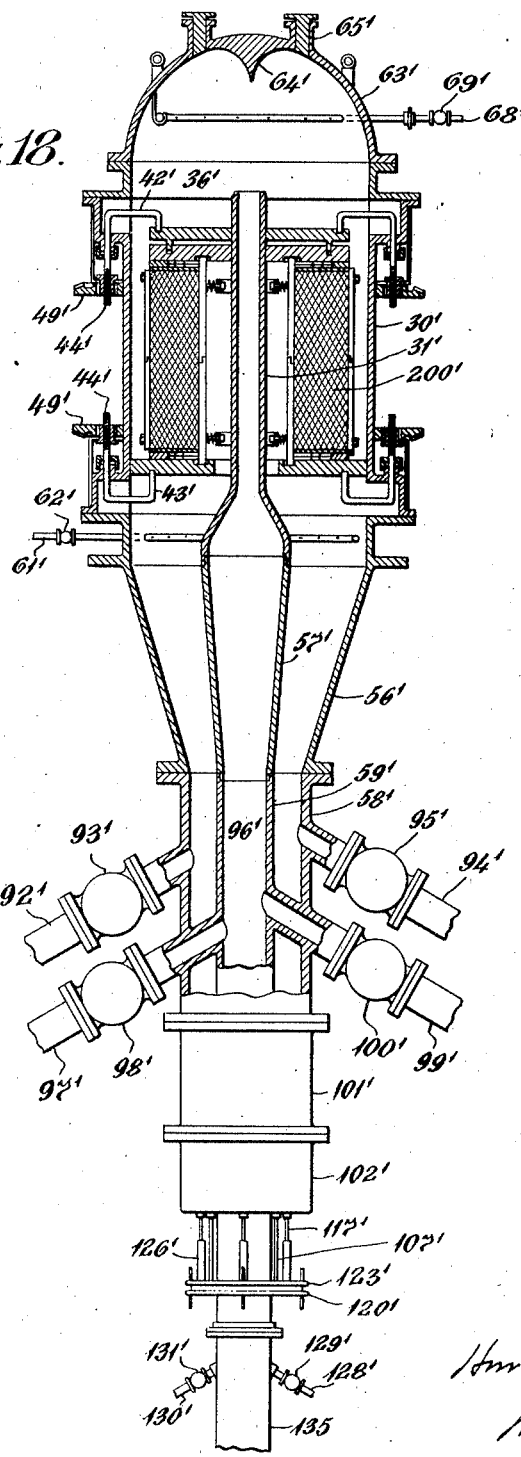

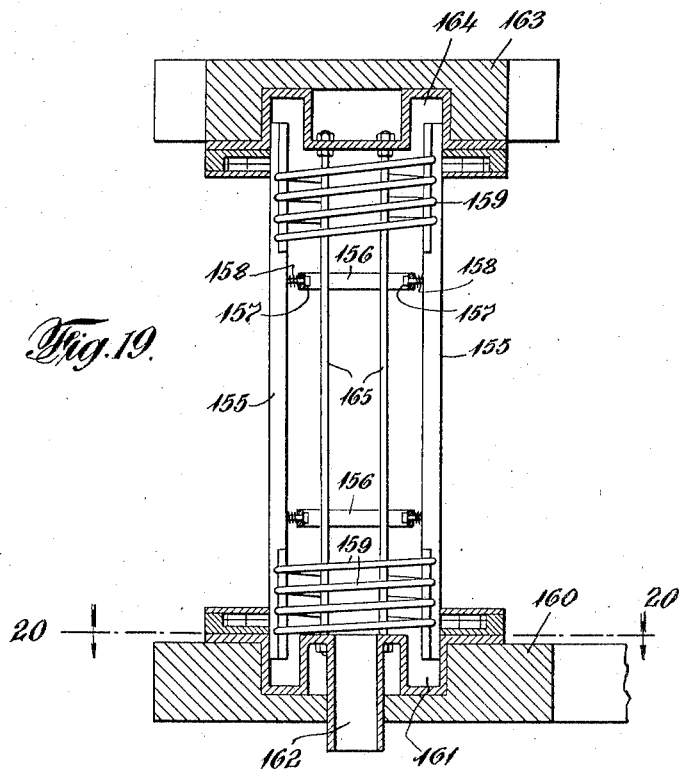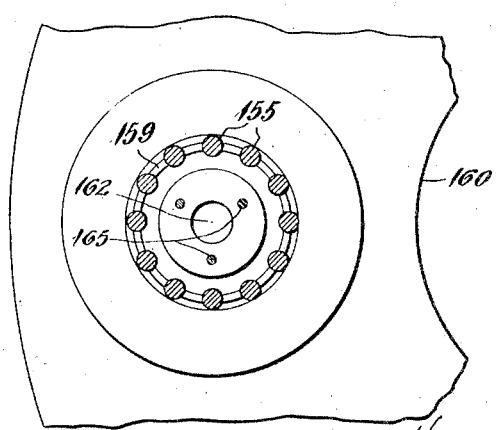

H. M. DUDLEY.
TEXTILE TREATING DEVICE.
APPLICATION FILED FEB. 25, 1919.
1,334,529.
Patented Mar. 23, 1920.
15 SHEETS—SHEET 13.
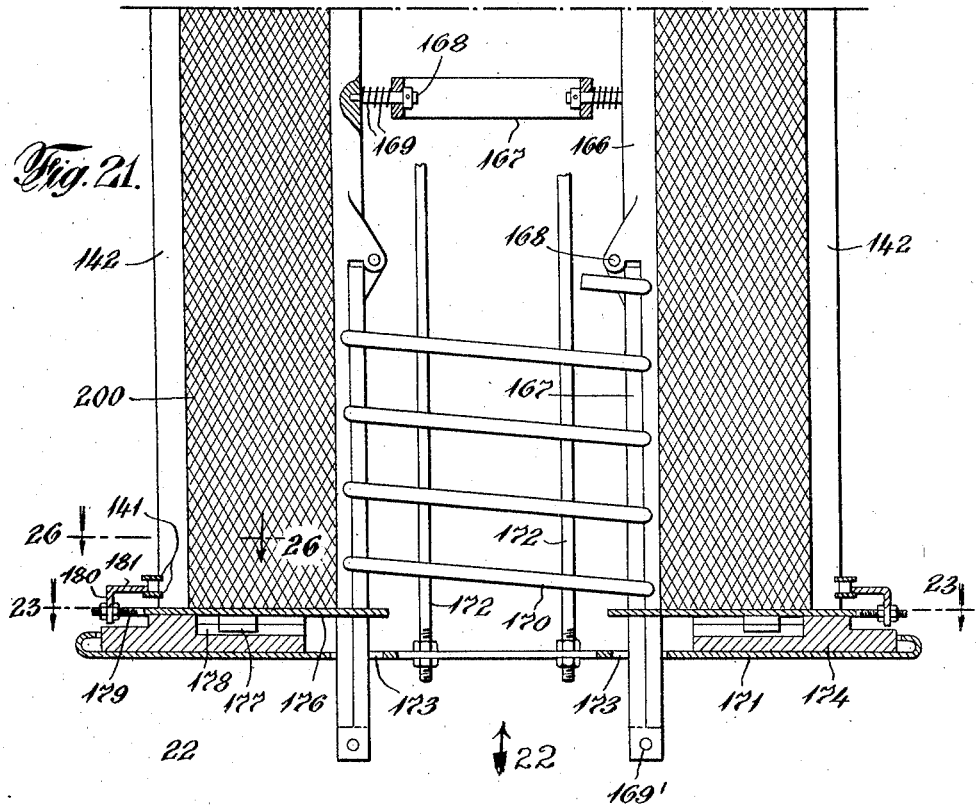
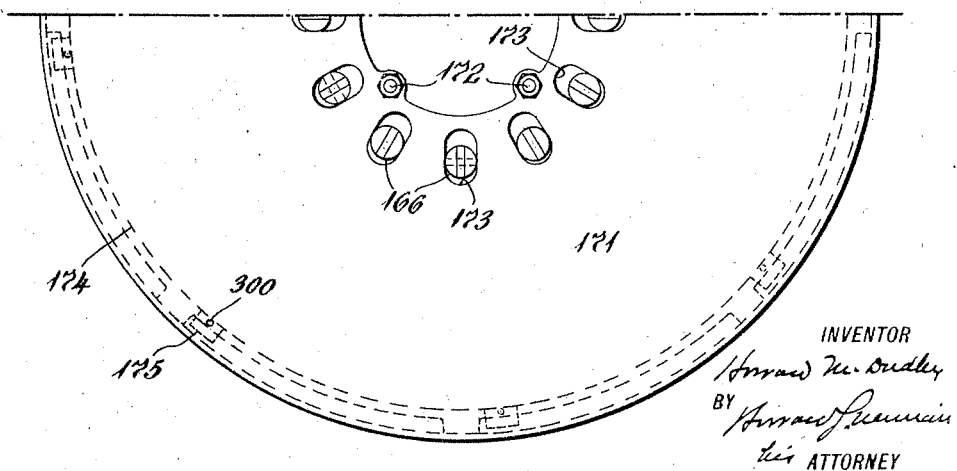
INVENTOR
BY
ATTORNEY

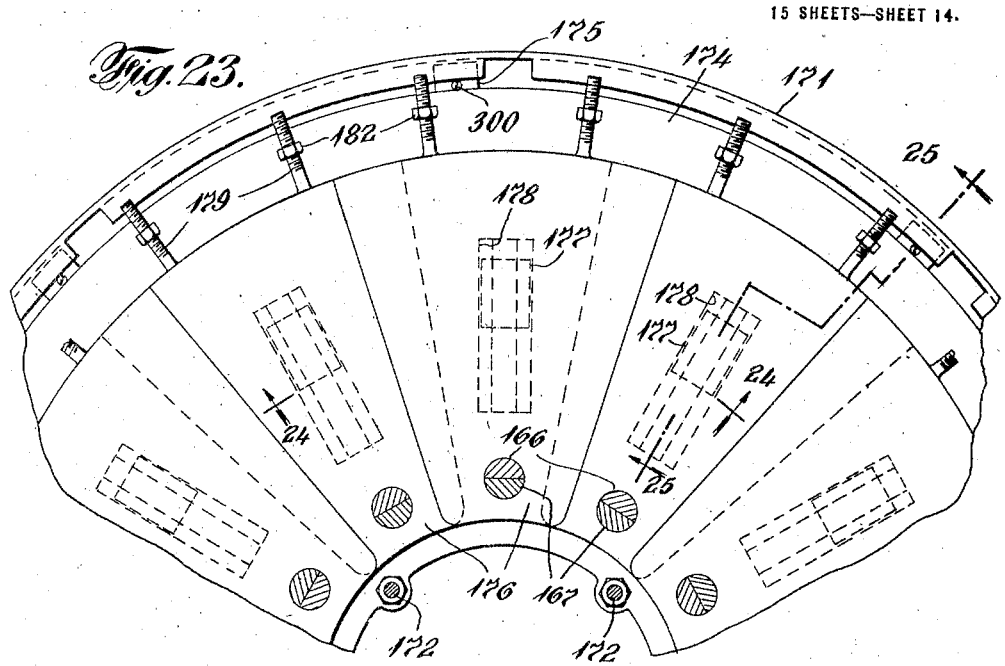
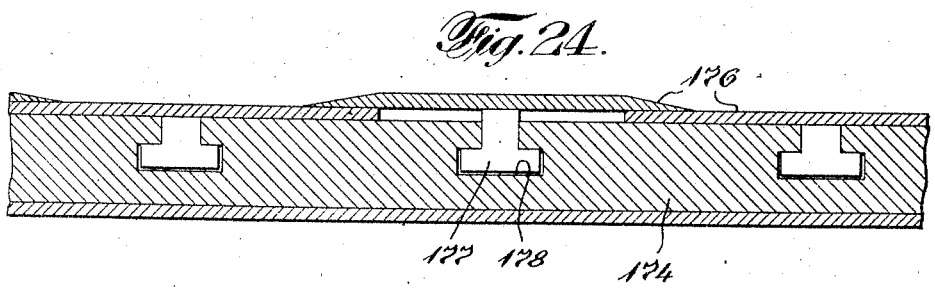
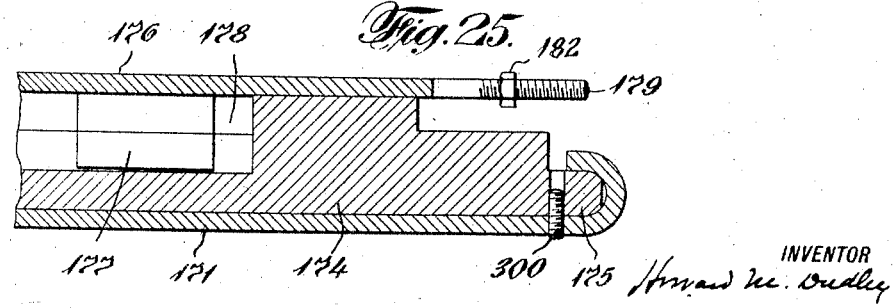

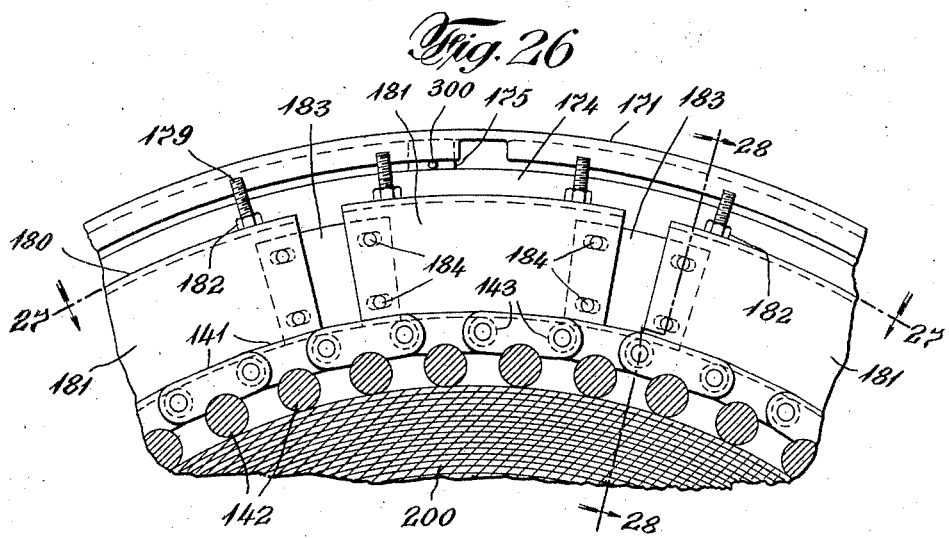
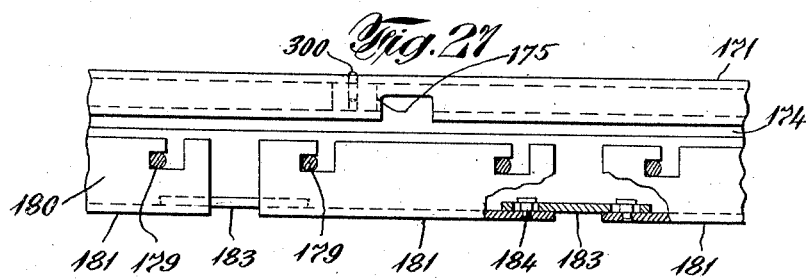
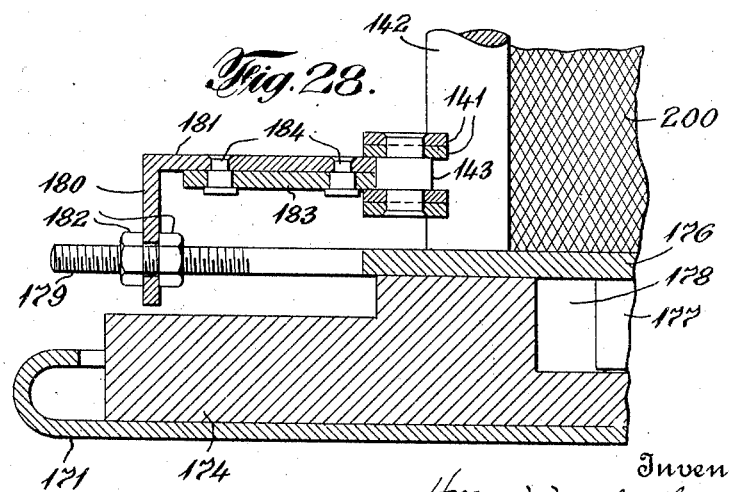

UNITED STATES PATENT OFFICE.

HOWARD M. DUDLEY, OF PHILADELPHIA, PENNSYLVANIA.

TEXTILE-TREATING DEVICE.

1,334,529.   Specification of Letters Patent.   Patented Mar. 23, 1920.

Application filed February 25, 1919. Serial No. 279,052.

*To all whom it may concern:*

Be it known that I, HOWARD M. DUDLEY, a citizen of the United States, residing in the city of Philadelphia, county of Philadelphia, and State of Pennsylvania, have invented certain new and useful Improvements in Textile-Treating Devices, of which the following is a full, clear, and exact specification.

My invention relates to textile treating devices and refers particularly to devices suitable for the treatment of textile fibers and fabrics by means of moving fluids and vapors.

One object of my invention is a device suitable for the treatment of fibers and fabrics of various forms of construction.

Another object of my invention is a device suitable for the treatment of various forms of textile fibers by passing liquids and vapors through them in reverse directions.

Another object of my invention is a device which can be readily and rapidly changed in its construction to be adapted for varying forms of textile fibers.

Another object of my invention is a device in which a practically uniform pressure may be maintained throughout a fiber mass.

Another object of my invention is a device in which a vapor may be passed uniformly throughout a fiber mass.

Another object of my invention is a device in which the condition of the treated fiber mass may be determined without opening the treating chamber or disturbing the mass.

Another object of my invention is a device in which fiber can be treated with a liquid, treated with a vapor and then dried without disturbing the fiber mass and without handling.

These and other objects of my invention will be evident upon a consideration of my drawings, specification and claims.

Textile fibers during their course of production are presented in several forms prior to their final completion into a fabric and it is frequently advisable to treat them with dyes and other agents in their various forms. For instance the dyeing operation is performed while the fibers are in their loose condition, yarns, skeins, warps, balls, cops or fabrics dependent upon the results desired.

The object of my invention is a device suitable for the treatment of fibers in several of these forms, thus overcoming the necessity of having a device which is suitable for only one form of fiber condition. This naturally results in a very considerable saving in the cost of machinery and amount of space occupied and facilitates the treating operation.

As these fibers during their treatment are in mass condition, considerable difficulty is encountered in treating all portions of the mass equally and uniformly with the liquid, as a dye liquid, as otherwise uneven and valueless results are obtained. By means of my device these difficulties are overcome and the results produced are even and uniform throughout all portions of the mass.

Another difficulty incident to such treatment is the determination of the condition of the fiber. This usually is observed by interrupting the treating process, opening the device and disturbing the mass by removing a portion thereof for observation. I overcome these difficulties by employing a smaller testing device of similar form and construction, exterior to the treating device, the fiber within the testing device receiving the same treatment as that of the larger mass, the condition of the latter being determined without interrupting the operation, opening the device or disturbing the mass.

The particular form of my device illustrated and explained is particularly suitable for treating fibers in the form of warps or fabrics or other forms in which the fiber is wound upon, or carried, by a beam.

My drawings and specification clearly show and describe a form of my device suitable for these purposes, although I do not limit myself to the particular construction thus shown and described.

In the accompanying drawings, illustrating modified forms of the device of my invention, similar parts are designated by similar numerals:—

Figure 1 is a vertical cross-section of one form of my device, the testing device being shown in plan view.

Fig. 2 is an enlarged vertical cross-section of the upper portion of the device of Fig. 1.

Fig. 3 is a section through the line 3—3 of Fig. 2.

Fig. 4 is a plan view of a head disk of Fig. 3.

Fig. 5 is a vertical cross-section of the lower portion of Fig. 1 with the beam removed.

Fig. 6 is a section through the line 6—6 of Fig. 5.

Fig. 7 is a section through the line 7—7 of Fig. 5.

Fig. 8 is a view in the direction of the arrow 8 of Fig. 9.

Fig. 9 is an enlarged section of the lower portion of one element of my device including the beam.

Fig. 10 is a section through the line 10—10 of Fig. 9.

Fig. 11 is a section through the line 11—11 of Fig. 10.

Fig. 12 is a plan view of the chain cover.

Fig. 13 is a section through the line 13—13 of Fig. 14.

Fig. 14 is an enlarged view of the central portion of one of the chain cover bars, partly in section.

Fig. 15 is a cross-section of the valve.

Fig. 18 is a vertical cross-section of the testing device.

Fig. 19 is a vertical cross-section of a modified form of beam.

Fig. 20 is a section through the line 20—20 of Fig. 19.

Fig. 21 is a vertical cross-section of the lower portion of a modified form of my device with beam.

Fig. 22 is a broken view in the direction of the arrow 22 of Fig. 21.

Fig. 23 is a broken section through the line 23—23 of Fig. 21 with the chain cover removed.

Fig. 24 is a section through the line 24—24 of Fig. 23.

Fig. 25 is a section through the line 25—25 of Fig. 23.

Fig. 26 is a section through the line 26—26 of Fig. 21.

Fig. 27 is a section through the line 27—27 of Fig. 26 with the chain cover removed.

Fig. 28 is a section through the line 28—28 of Fig. 26.

Figure 16:
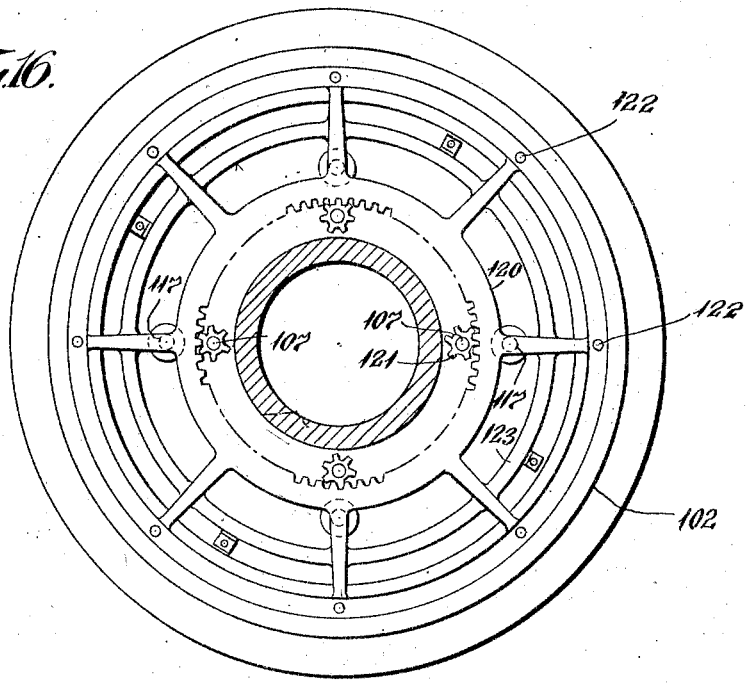
Fig. 16 is a section through the line 16—16 of Fig. 15.
Figure 17:
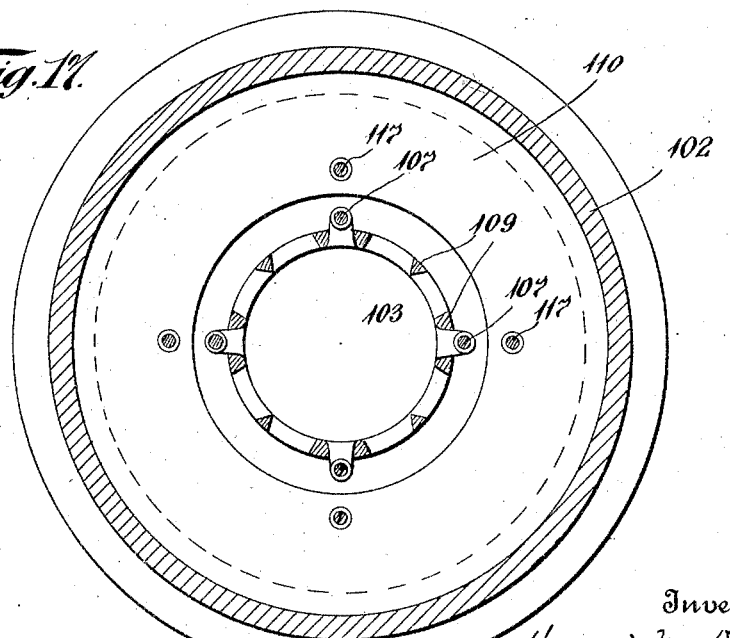
Fig. 17 is a section through the line 17—17 of Fig. 15.

The particular form of my device shown in the accompanying drawings comprises a casing 30 within which is a centrally positioned pipe 31. The casing 30 has a series of outwardly extended portions 32, 32 forming chambers 33, 33 connected with the main chamber or dyeing chamber 34 within the casing 30. Slidable within the chamber 34 and capable of abutment upon the faces of the members 30 and 31 is a legged spider follower 35 carrying a series of annular plates 36, 36. Each plate 36 has an annular downwardly projecting member 37 and a series of threaded bolts 38, 38. Situated below each plate is a head disk 39 having an annular recess 40 to receive the projection 37 of the plate 36 and an annular recess 41 within its other face.

Within each chamber 33 there is a U-shaped rod 42, one arm 43 of which extends downwardly into a recess within the upper face of the plate 36 and the other arm 44 extending through the casing member 32 and the stuffing-box 45, the lower portion of the arm 44 being threaded.

Supported by the brackets 55, 55 is a gear wheel 46 revoluble upon the shaft 47 and having the extended handle 48. Supported upon the same brackets is an externally and internally toothed annular member 49, the exterior teeth meshing with the gear wheel 46 and the internal teeth meshing with an externally toothed and internally threaded revoluble annular member 50, the interior threads of which mesh with the threads of the arm 44.

The operation of this portion of the device is as follows:—

In order to introduce the spider 35, the arm 43 is revolved out of the way into the dotted line position of Fig. 3, the spider introduced, the arm 43 revolved back into a position over the recess in the plate 36. This is done with each arm 43 and then the wheel 46 is revolved, revolving the member 49, which in turn revolves all of the members 50, 50, thus lowering the U-shaped rods 42, 42 and moving all of the plates 36, 36 uniformly.

The bottom portion of the dyeing chamber 34 contains a slidable plate 51 having a series of openings 52, 52 and a series of annular recesses 53, 53 around the openings. The plate 51 is moved by a U-shaped member with gears exactly as described above for the movement of the spider 35.

The lower portion of the casing 30 is attached to the conical member 56 having a hollow cylindrical member 57 abutting upon the cylindrical member 31 and the lower portion of the member 56 is connected to the hollow cylindrical member 59 abutting upon the member 57. The arms 60, 60 connect the members 56 and 57.

A perforated pipe 61, carrying the valve 62, for the introduction of steam or vapor, is within the lower portion of the dyeing chamber 34.

A top 63 has an inwardly extended projection 64 forming a domed-shaped construction to throw the liquid downwardly and equally. The top 63 also has pipes 65, 65, which can be connected to a source of air supply or can be closed by the member 67, affixed by the clamps 68, 68. A perforated pipe 68' for the introduction of steam or vapor is within the top 63, the pipe having the valve 69 without the top and resting upon the hook 70 within the top.

The chamber 91 within the member 58 is connected to the pipe 92 carrying the valve 93, and the pipe 94 carrying the valve 95. The chamber 96 within the member 59 is connected to the pipe 97 carrying the valve 98, and the pipe 99 carrying the valve 100.

Attached to the member 58 is a valve comprising the exterior annular member 101, 102, into the upper portion of which the member 59 extends.

Within the valve (Fig. 15) is a slidable double ended conical member 103, the annular shoulder 104 of which is capable of abutment upon the annular shoulder 105 of the member 59, a tight joint being maintained by the packing 106. A series of rods 107, 107 is revolubly held in the extended flange 108 of the member 103. The movement of the member 103 is guided by the fixed bars 109, 109 slidable within suitable recesses within the member 103.

Slidable within the valve casing 101, 102 is an annular member 110, the shoulder 111 of which is capable of abutment upon the shoulder 112 of the member 101, a tight joint being maintained by the packing 113. The shoulder 114 of the member 110 is capable of abutment upon the shoulder 115 of the member 59, a tight joint being maintained by the packing 116. A series of rods 117, 117 is revolubly carried by the member 110.

Carried by the member 118, fixedly attached to the hollow member 119, which is an extension of the member 102, is a revoluble annular member 120 interiorly toothed, the teeth of which mesh with a series of revoluble toothed members 121, each of which is threaded to mesh with the thread upon a rod 107, a series of handles 122, 122 facilitating the revolution of the member 120. The revolution of the member 120 revolves the series of members 121, 121, thus moving the rods 107, 107 and sliding the valve member 103. Carried by the member 118 is a revoluble annular member 123 having a series of handles 124, 124 and being internally toothed to mesh with the gear wheel 125 which carries the internally threaded sleeve 126 meshing with the threads of the rods 117, 117. The revolution of the member 123 revolves the members 125 thus moving the rods 117, 117 and moving the valve member 110.

The member 119 is connected to the pipe 127 which is connected to the pipe 128 carrying the valve 129, and the pipe 130 carrying the valve 131.

A testing device 30', shown in enlarged cross-section in Fig. 18, similar and proportionate to one unit of the larger device is situated exterior to the larger device and is connected to the pipe 127 by means of the pipe 135. Parts of the testing device similar to those of the larger device are designated by similar prime numerals.

While I do not limit myself to any particular form of beam, I show and describe one construction which is suitable for use in my device. This beam comprises a series of spaced parallel bars 136, 136 maintained in position by a series of bolts 137, 137, slidable within the two rings 138, 138, positioned at the two end portions of the bars 136, 136. A spiral spring 139, encircling each bolt 137, abuts upon the bar 136 and the ring 138. Each bar 136 is made in two sections dove-tailed at 140 to allow of movement with respect to each other. The fabric or fiber 200 is wound around the bars 136, 136 and a chain-cover placed around the fabric or fiber. This chain-cover comprises two series of links 141, 141, each link bearing upon a bar 142. The links 141, 141 are pivotally connected by the pivots 143, 143 movable within slots 144, 144 of the links 141, 141. A clamp 145, capable of gripping the two end pivots 143, 143 of each chain affords a means for loosening or tightening the chain-cover upon the wound fabric or fiber. Each bar 142 is composed of two parts dove-tailed at 146 to each other. Within each bar 142 at the point of juncture of the two parts is a cylindrical member 147, slidable within the recess 148 of the bar 142, a pin 149 extending into the recess 150 of the member 147 and into the elongated slot 151 of the bar 142. The two parts of each bar 142 may thus move longitudinally with respect to each other, the member 147 acting as a supporting means over which the bar 142 slides.

A series of expansible heads 201, 201 is situated around each recess 53. These expansible heads comprise a series of outwardly extended over-lapping plates 152, 152, each carrying an outwardly extended headed nut 153, slidable within a recess 154 of the annular member 155 abutting upon the plate 51, the plates 152, 152 having openings through which the bars 136, 136 extend. It is evident therefore that the circumferential expansion or contraction of the series of bars 136, 136, due to liquid pressure, will move the plates 152, 152 outwardly or inwardly thus not disturbing the fabric or fiber abutting thereon.

A series of similar expansible heads 202, 202 is situated at the other extremity of the device.

A modified form of a beam suitable for use with my device is shown in Figs. 19 and 20. This beam comprises a series of spaced bars 155, 155 maintained in position by the rings 156, 156 to which they are slidably attached by the bolts 157, 157, carrying the springs 158, 158. The bars 155, 155 carry the resilient coiled members 159, 159 at each end thereof, the members 159, 159 being slidable within the bars 155, 155. The annular member 160, having the annular recesses 161 and the opening 162, is attached to the annular member 163 having the annular recess 164 by the stay bolts 165, 165.

Another modification of the beam is shown in Figs. 21 and 22. This modification comprises a series of parallel spaced bars 166, 166 maintained in position by means of the ring 167, to which they are connected by the slidable bolts 168, 168 carrying the springs 169, 169, a similar connecting means being at the upper extremity of the beam. The end portion of each bar 166 has a split portion 167 hinged at 168 and capable of being fastened together by the bolt 169'. This construction is for the ready assembling of the coiled member 170, which is slidable through the openings of the bars 166, 166. A lower annular member 171, is connected to a similar annular member 171 (not shown) at the other end of the beam by means of the stay-rods 172, 172. The two members 171, 171, have elongated slots 173, 173, through which the bars 166, 166 extend.

A modified form of an extensible head is shown in Figs. 23 to 28 inclusive. Abutting upon the member 171 is an annular member 174, connected to the member 171 by means of the bayonet joint 175. A threaded bolt 300 maintains the members 171 and 174 from movement. Abuttable upon the member 174 is the expansible head comprising a series of outwardly extended over-lapping plates 176, 176, each carrying a headed nut 177 movable within the recess 178 of the member 174. Each plate 176 contains an opening through which passes a bar 166. Attached to the outer portions of the plates 176, 176 is a series of threaded bolts 179, 179. The bolts 179, 179 pass through a series of plates formed by the right angled members 180, 181. The nuts 182, 182 threaded upon the bolts 179, 179 allow the movement of the plates 180, 181 and maintain them in position. The plates 181, 181 are slidably connected by means of the plates 183, 183, bolts 184, 184 passing through elongated openings in the plates 183, 183.

The operation of the device is as follows:—

The wound beam, and the various parts of the device are assembled in the larger device and in the testing device as shown in the drawings and described above. All of the valves are closed with the exception of the valves 95 and 95'. The valve member 103 is placed in the position of the dotted line 103' (Fig. 15) and the valve member 110 is placed in the position shown in Fig. 15. A liquid is then forced inwardly through the pipe 127, passing through the member 119, the member 59, the member 57, the member 31 into the dome of the device whence it is reflected downwardly into the chamber 34 and inwardly through the fiber and the reels into the interiors thereof and then downwardly through the openings 52, the chamber 56, the member 58 and the pipe 94 into a reserve tank and back into the liquid forcing means for continuous circulation.

When it is desired to reverse the flow of the liquid, valves 95 and 95' are closed, valves 100 and 100' are opened, the valve member 103 is placed in the position shown in Fig. 15 and the valve member 110 is placed in the dotted line position 110'. The liquid then passes in a reverse direction from the interior of the reel outwardly and from out the device through the pipe 99 for continuous circulation.

When it is desired to pass air through the device, all of the valves are closed except valves 129, 129', 93 and 93', the valve member 103 is placed in the position of the dotted line 103' of Fig. 15 and the valve member 110 is placed in the position shown in Fig. 15. The air thus passes through the device as described above, passing out of the device through the pipe 92. The reverse flow of air is accomplished by closing valves 93 and 93', placing the valve member 103 as shown in Fig. 15 and the valve member 110 in the position 110' and opening valve 98, the air thus passing outwardly through the pipe 97. The various pipes of the larger device are connected with the corresponding pipes of the testing device marked with prime numerals and thus the liquid and air passes similarly through the testing device and its contents.

By the above means my device is suitable for use with varying kinds of beams and spindles used in the treatment of fabric and of fibers in the form of warps, warp-balls, and similar forms.

I do not limit myself to the particular size, shape, number or arrangement of parts as shown and described, all of which may be varied without going beyond the scope of my invention as shown, described and claimed.

What I claim is:—

1. In a textile treating device, in combination, a dyeing chamber, a series of fiber-carrying beams within the dyeing chamber, an expansible head at each end of each beam, means for passing a liquid simultaneously inwardly through the series of beams and means for passing a liquid simultaneously outwardly through the series of beams.

2. In a textile treating device, in combination, a dyeing chamber, a series of fiber-carrying beams within the dyeing chamber, an expansible head at each end of each beam, means for passing a liquid simultaneously inwardly through the series of beams, means for passing a liquid simultaneously outwardly through the series of beams, means fos passing air simultaneously inwardly through the series of beams and means for passing air simultaneously outwardly through the series of beams.

3. In a textile treating device, in combination, a dyeing chamber, a series of fiber-carrying beams within the dyeing chamber, means for compressing fiber upon the beams, an expansible head at each end of each beam, means for passing a liquid simultaneously inwardly through the series of beams and means for passing a liquid simultaneously outwardly through the series of beams.

4. In a textile treating device, in combination, a dyeing chamber, a series of fiber-carrying beams within the dyeing chamber, means for compressing fiber upon the beams, an expansible head at each end of each beam, means for passing a liquid simultaneously inwardly through the series of beams, means for passing a liquid simultaneously outwardly through the series of beams, means for passing air simultaneously inwardly through the series of beams, and means for passing air simultaneously outwardly through the series of beams.

5. In a textile treating device, in combination, a dyeing chamber, a series of fiber-carrying beams within the dyeing chamber, an expansible head at each end of each beam, an expansible foraminous cover upon the fiber, means for passing a liquid simultaneously inwardly through the series of beams and means for passing a liquid simultaneously outwardly through the series of beams.

6. In a textile treating device, in combination, a dyeing chamber, a fiber-carrying beam within the dyeing chamber, means for compressing fiber upon the beam, an expansible foraminous cover upon the fiber, an expansible head at each end of the beam, means for passing a liquid inwardly through the beam and means for passing a liquid outwardly through the beam.

7. In a textile treating device, in combination, a dyeing chamber, a series of fiber-carrying beams within the dyeing chamber, means for compressing fiber upon the beams, an expansible foraminous cover upon the fiber, an expansible head at each end of each beam, means for passing a liquid simultaneously inwardly through the series of beams and means for passing a liquid simultaneously outwardly through the series of beams.

8. In a textile treating device, in combination, a dyeing chamber, a series of fiber-carrying beams within the dyeing chamber, means for compressing fiber upon the beams, an expansible foraminous cover upon the fiber, an expansible head at each end of each beam, means for passing a liquid simultaneously inwardly through the series of beams, means for passing a liquid simultaneously outwardly through the series of beams, means for passing air simultaneously inwardly through the series of beams and means for passing air simultaneously outwardly through the series of beams.

9. In a textile treating device, in combination, a dyeing chamber, a series of fiber-carrying beams within the chamber, an expansible head abutting upon each end of the fiber upon the beams, a plate at each end of the beams for maintaining their position, means for passing a liquid inwardly through the beams, means for passing a liquid outwardly through the beams, means for passing air inwardly through the beams and means for passing air outwardly through the beams.

10. In a textile treating device, in combination, a dyeing chamber, a series of fiber-carrying beams within the chamber, an expansible head abutting upon each end of the fiber upon the beams, a plate at each end of the beams for maintaining their position and for compressing fiber upon the beams, means for passing a liquid inwardly through the beams, means for passing a liquid outwardly through the beams, means for passing air inwardly through the beams and means for passing air outwardly through the beams.

11. In a textile treating device, in combination, a dyeing chamber, a series of fiber-carrying beams within the chamber, an expansible head abutting upon each end of the fiber upon the beams, a plate at each end of the beams for maintaining their position and for compressing fiber upon the beams, an expansible foraminous cover upon fibers upon each beam of the series, means for passing a liquid inwardly through the beams, means for passing a liquid outwardly through the beams, means for passing air inwardly through the beams and means for passing air outwardly through the beams.

12. In a textile treating device, in combination, a dyeing chamber, a series of fiber-carrying beams within the chamber, an expansible head abutting upon each end of the fiber upon the beams, a plate at each end of the beams for maintaining their position, means exterior of the dyeing chamber for simultaneously compressing fiber upon the series of beams, means for passing a liquid inwardly through the beams, means for passing a liquid outwardly through the beams, means for passing air inwardly through the beams and means for passing air outwardly through the beams.

13. In a textile treating device, in combination, a dyeing chamber, a series of fiber-carrying beams within the chamber, an expansible head abutting upon each end of the fiber upon the beams, a plate at each end of the beams for maintaining their position, means exterior of the dyeing chamber for simultaneously compressing fiber upon the series of beams, an expansible foraminous cover upon the fibers upon each beam of the series, means for passing a liquid inwardly through the beams, means for passing a liquid outwardly through the beams, means for passing air inwardly through the beams and means for passing air outwardly through the beams.

14. In a textile treating device, in combination, a dyeing chamber, a series of fiber-carrying beams within the chamber, an expansible head abutting upon each end of the fiber upon the beams, a plate at each end of the beams for maintaining their position, means for moving the plate with respect to each other compressing fiber upon the beams, means for passing a liquid inwardly through the beams, means for passing a liquid outwardly through the beams, means for passing air inwardly through the beams and means for passing air outwardly through the beams.

15. In a textile treating device, in combination, a dyeing chamber, a series of fiber-carrying beams within the chamber, an expansible head abutting upon each end of the fiber upon the beams, a plate at each end of the beams for maintaining their position, means for moving the plate with respect to each other compressing fiber upon the beams, an expansible foraminous cover upon fibers upon each beam of the series, means for passing a liquid inwardly through the beams, means for passing a liquid outwardly through the beams, means for passing air inwardly through the beams and means for passing air outwardly through the beams.

16. In a textile treating device, in combination, a dyeing chamber, a series of fiber-carrying beams within the chamber, an expansible head abutting upon each end of the fiber upon the beams, a plate at each end of the beams for maintaining their position, a domed-shaped top to the dyeing chamber reflecting a liquid equally upon the beams, means for passing a liquid inwardly through the beams, means for passing a liquid outwardly through the beams, means for passing air inwardly through the beams and means for passing air outwardly through the beams.

17. In a textile treating device, in combination, a dyeing chamber, a series of fiber-carrying beams within the chamber, an expansible head abutting upon each end of the fiber upon the beams, a plate at each end of the beams for maintaining their position and for compressing fiber upon the beams, a domed-shaped top to the dyeing chamber reflecting a liquid equally upon the beams, means for passing a liquid inwardly through the beams, means for passing a liquid outwardly through the beams, means for passing air inwardly through the beams and means for passing air outwardly through the beams.

18. In a textile treating device, in combination, a dyeing chamber, a series of fiber-carrying beams within the chamber, an expansible head abutting upon each end of the fiber upon the beams, a plate at each end of the beams for maintaining their position, means exterior of the dyeing chamber for simultaneously compressing fiber upon the series of beams, a dome-shaped top to the dyeing chamber reflecting a liquid equally upon the beams, means for passing a liquid outwardly through the beams, means for passing air inwardly through the beams and means for passing air outwardly through the beams.

19. In a textile treating device, in combination, a dyeing chamber, a series of fiber-carrying beams within the chamber, an expansible head abutting upon each end of the fiber upon the beams, a plate at each end of the beams for maintaining their position, means for moving the plate with respect to each other compressing fiber upon the beams, a domed-shaped top to the dyeing chamber reflecting a liquid equally upon the beams, means for passing a liquid inwardly through the beams, means for passing a liquid outwardly through the beams, means for passing air inwardly through the beams and means for passing air outwardly through the beams.

Signed at New York city, in the county of New York and State of New York, this 19th February, 1919.

HOWARD M. DUDLEY.